United States Patent
Lee et al.

(10) Patent No.: US 8,342,285 B2
(45) Date of Patent: Jan. 1, 2013

(54) FULLY DECOUPLED HYDRAULIC TORQUE STRUT

(75) Inventors: Ping Lee, Kitchener (CA); Daniel G. Gannon, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/073,177

(22) Filed: Mar. 28, 2011

(65) Prior Publication Data

US 2012/0091639 A1   Apr. 19, 2012

Related U.S. Application Data

(63) Continuation-in-part of application No. 12/904,350, filed on Oct. 14, 2010.

(51) Int. Cl.
*F16F 13/06* (2006.01)
(52) U.S. Cl. .................................. 180/312; 267/140.11
(58) Field of Classification Search .................. 180/312; 267/140.11, 140.12, 140.13, 140.15
See application file for complete search history.

(56) References Cited

U.S. PATENT DOCUMENTS

| | | | |
|---|---|---|---|
| 4,588,173 A * | 5/1986 | Gold et al. | 267/140.13 |
| 4,648,576 A | 3/1987 | Matsui | |
| 4,738,434 A * | 4/1988 | Marjoram et al. | 267/140.13 |
| 4,783,063 A * | 11/1988 | Probst et al. | 267/140.13 |
| 4,828,234 A | 5/1989 | Hoying et al. | |
| 4,925,162 A * | 5/1990 | Kojima | 267/140.13 |
| 4,932,636 A * | 6/1990 | Phillips et al. | 267/140.13 |
| 5,215,293 A | 6/1993 | Muramatsu et al. | |
| 5,462,261 A | 10/1995 | Eckel et al. | |
| 5,540,549 A | 7/1996 | McGuire | |
| 5,769,402 A * | 6/1998 | Ide et al. | 267/140.14 |
| 5,782,462 A | 7/1998 | Hein et al. | |
| 5,865,428 A | 2/1999 | Kojima | |
| 6,036,183 A | 3/2000 | Lee et al. | |
| 6,082,718 A | 7/2000 | Yamada et al. | |
| 6,264,181 B1 * | 7/2001 | Muramatsu et al. | 267/140.14 |
| 6,357,730 B1 | 3/2002 | Gugsch et al. | |
| 6,361,031 B1 | 3/2002 | Shores et al. | |
| 6,406,010 B1 | 6/2002 | Yano et al. | |
| 6,540,042 B2 | 4/2003 | Hamaekers et al. | |
| 6,547,226 B2 | 4/2003 | Shores et al. | |
| 6,598,864 B2 | 7/2003 | Freudenberg et al. | |
| 6,663,090 B2 | 12/2003 | Simuttis et al. | |
| 7,025,341 B2 | 4/2006 | Ichikawa et al. | |
| 7,137,624 B2 * | 11/2006 | Russell et al. | 267/141.1 |
| 7,194,344 B2 | 3/2007 | Gee et al. | |
| 7,300,382 B2 | 11/2007 | Yamamoto | |
| 7,325,795 B2 * | 2/2008 | Debolt et al. | 267/140.13 |
| 7,416,173 B2 | 8/2008 | Tanaka | |
| 7,475,872 B2 * | 1/2009 | Kries et al. | 267/140.13 |
| 7,931,258 B2 * | 4/2011 | Russell et al. | 267/219 |

(Continued)

OTHER PUBLICATIONS

U.S. Appl. No. 12/904,350 to Gannon, et al, filed Oct. 14, 2010.

*Primary Examiner* — Drew Brown

(57) ABSTRACT

A hydraulic device disposed in a torque strut so as to provide a fully decoupled hydraulic torque strut. A main rubber element vibrates in response to powertrain pitch torque. At high vibration amplitude, high hydraulic damping is provided via a pumping chamber, an inertia track and a bellowed compensation chamber, wherein a decoupler system hydraulically connected to the pumping chamber is passively disabled. At low vibration amplitude, minimal hydraulic damping is provided via the decoupler system which is connected by a decoupler track to the compensation chamber.

18 Claims, 6 Drawing Sheets

U.S. PATENT DOCUMENTS

| | | |
|---|---|---|
| 2001/0013677 A1 | 8/2001 | Miyoshi et al. |
| 2004/0188901 A1* | 9/2004 | Debolt et al. ............ 267/140.13 |
| 2007/0138719 A1 | 6/2007 | Ichikawa et al. |
| 2009/0179360 A1 | 7/2009 | Quinn et al. |
| 2010/0102492 A1 | 4/2010 | Lee |
| 2010/0148413 A1* | 6/2010 | Lee ......................... 267/140.11 |
| 2011/0024960 A1* | 2/2011 | Bradshaw et al. ....... 267/140.13 |
| 2011/0042872 A1 | 2/2011 | Hasegawa et al. |
| 2011/0193275 A1* | 8/2011 | Russell et al. ........... 267/140.13 |
| 2012/0049424 A1* | 3/2012 | Bradshaw et al. ....... 267/140.14 |

* cited by examiner

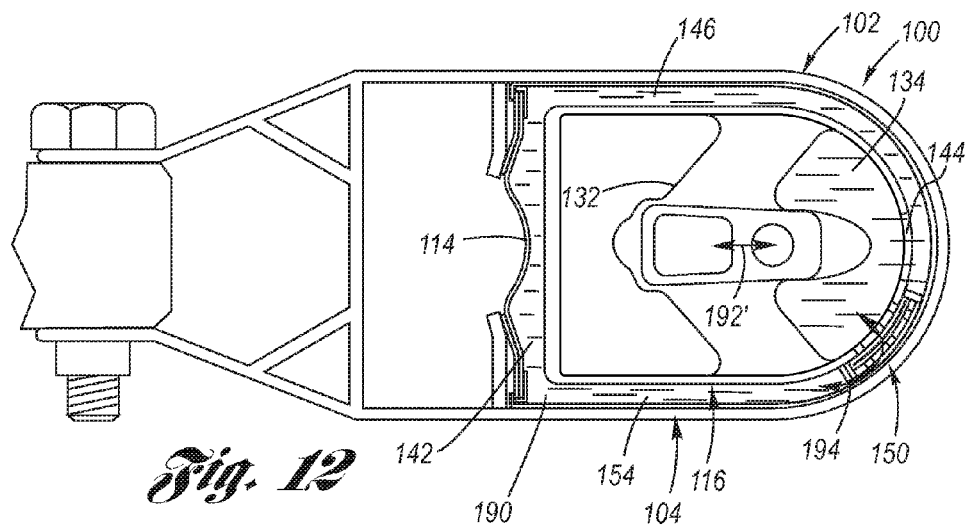
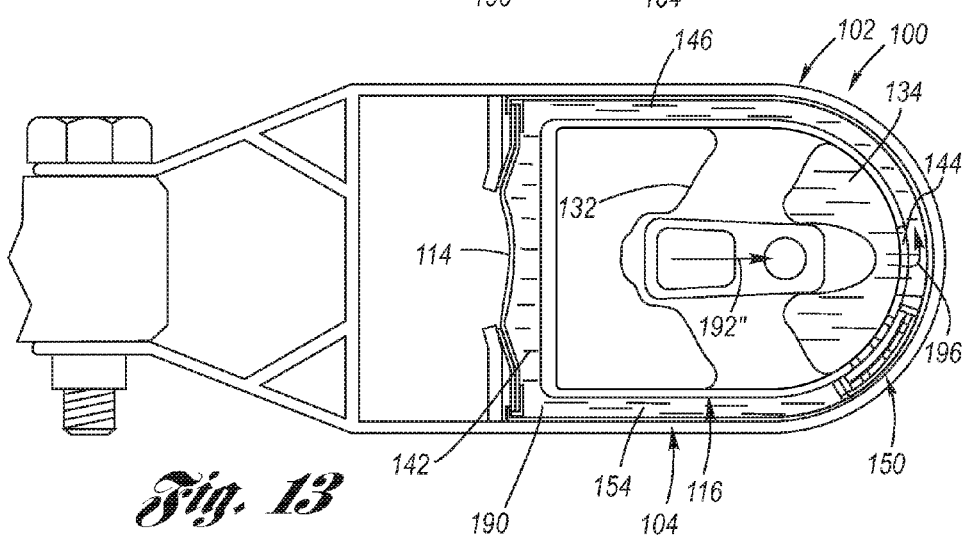
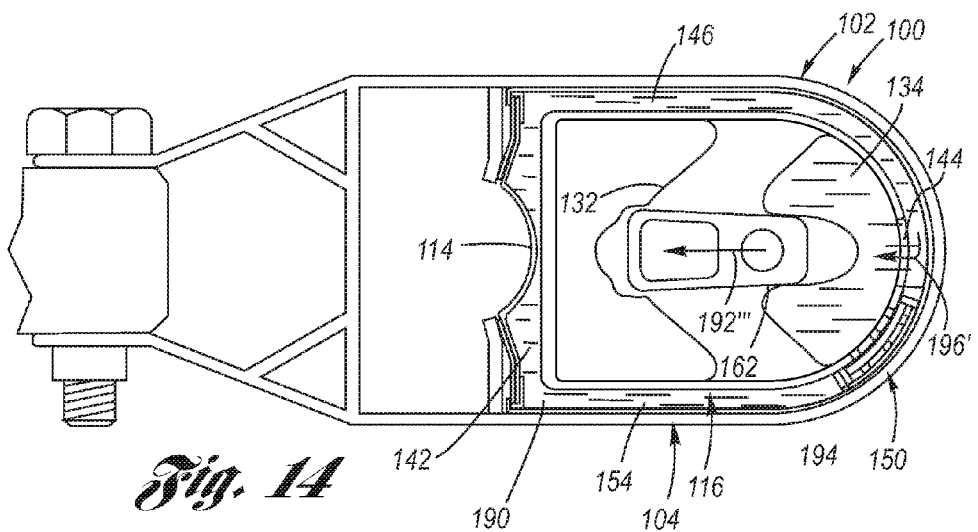

FULLY DECOUPLED HYDRAULIC TORQUE STRUT

CROSS-REFERENCE TO RELATED APPLICATIONS

The present application is a Continuation-in-Part of application Ser. No. 12/904,350, filed on Oct. 14, 2010, which application is presently pending.

TECHNICAL FIELD

The present invention relates to mounting systems used for mounting a powertrain in motor vehicle applications, particularly to pendular mounting systems, and more particularly to a fully decoupled pitch damping hydraulic torque strut at the torque strut mount thereof.

BACKGROUND OF THE INVENTION

Powertrain mounting systems used in motor vehicle applications include the "pendular" mounting system, exemplified at FIG. 1. In the pendular mounting system 10, there is included (dispositions being relative to forward travel direction 26 of the motor vehicle) a right-hand load bearing mount 12, a left-hand load bearing mount 14, and a (rear disposed) torque reacting strut mount 18, composed of a torque strut 20 and a torque strut bracket assembly 22. The two load bearing mounts being disposed in alignment with the torque roll axis 16 of the powertrain, which passes through its center of gravity, and the torque reacting torque strut mount 18 is disposed so as to carry minimal static force pre-loading, while providing reaction to powertrain pitch arising from torque loading about the torque roll axis, wherein the pitch of the powertrain is registered at the torque strut mount component(s) generally as a couple or moment in a plane normal to the torque roll axis.

In further detail, as shown at FIGS. 2 and 3, the prior art torque reacting strut mount 18 features the torque strut 20 mounted to the cradle or other vehicle structural member 24 and the torque strut bracket assembly 22 is mounted to the power train 28 (shown in phantom at FIG. 1). The torque strut bracket assembly 22 is pivotally connected to the torque strut 20. A rigid bushing 30 of the torque strut bracket assembly carries a sleeve 32 set in rubber 34. A bolt 38 is threadingly secured to a threaded feature 60 of a torque strut clevis 36 to thereby attach the torque strut 20 to the torque strut bracket assembly 22.

As shown best at FIG. 3, the torque strut 20 includes a cylindrical head 40 connected with the clevis 36. The head 40 has a circular inner space 42 defined by an inner head race 44. Disposed in the inner space 42 is a rubber element 46 having a central body 48 and distal arms 50 which radially connect to the inner head race 44. A metallic core 52 is in part overmolded by the rubber element 46, and has a through hole 54. As shown at FIG. 2, a bolt 56 secures the torque strut 20 to the cradle or other structural member 24 via passage through the through hole 54. Powertrain pitching torque loads act on the torque strut, wherein the rubber element reacts in elastic deformation depending on the mutually opposite directions of the pitching torque loads.

When the motor vehicle is in operation, powertrain pitching due to various levels of torque loading occurs at the torque reacting mount component member(s), which includes both high and low vibration amplitudes for which damping and stiffness requisites vary. High vibration amplitude events include engine start/stop, garage shifts, rough road shake, and smooth road chuggle. Low amplitude vibration events include idle vibration and smooth road shake vibration. Therefore, a drawback of prior art torque reacting mount components utilizing solely an elastic element for reaction to powertrain pitch, is that the elastic element is unable to adjust itself in terms of stiffness and damping to the various high and low vibration amplitudes presented to it during powertrain pitching events. A secondary bumper 55 is provided for providing an abutment to the inner head race 44 in the event of an extreme engine pitch event.

A dual aspect mount device known in the prior art is a hydraulic mount used for left and right load bearing powertrain mounts. In a first aspect, a hydraulic mount provides location of one object, such as a motor vehicle powertrain, with respect to a second object, as for example the body, frame structure or cradle of the motor vehicle. In a second aspect, the hydraulic mount provides damping for high vibration amplitude events while providing low dynamic stiffness to isolate small amplitude powertrain vibration with respect to body of the motor vehicle. Hydraulic mounts which are used for motor vehicle applications are represented, for example, by U.S. Pat. Nos. 4,828,234, 5,215,293 and 7,025,341.

U.S. Pat. No. 5,215,293, by way of example, discloses a hydraulic mount having a rigid upper member which is bolted to the powertrain and a lower powertrain member which is bolted to the frame (or cradle), wherein the upper and lower members are resiliently interconnected. The upper member is connected to a resilient main rubber element. Vibration of the main rubber element in response to engine vibration is transmitted to an adjoining upper fluid chamber. The upper fluid chamber adjoins a rigid top plate having an idle inertia track there through which communicates with an idle fluid chamber. The idle fluid chamber is separated from an idle air chamber by an idle diaphragm. The idle air chamber is selectively connected to atmosphere or to engine vacuum in order to selectively evacuate the idle air chamber in which case the idle diaphragm is immobilized. A bounce inertia track is formed in the top plate and communicates with a lower fluid chamber which is fluid filled. A bellows separates the lower fluid chamber from a lower air chamber which is vented to the atmosphere.

The idle inertia track has a larger cross-sectional area and a shorter length than that of the bounce inertia track, such that the ratio provides resonant frequency damping at the respectively selected resonance frequencies. In this regard, the resonance frequency of the fluid flowing through the idle inertia track is set to be higher than that of the fluid flowing through the bounce inertia track. As such, this prior art hydraulic mount is able to effectively damp relatively low frequency vibrations over a lower frequency range, such as powertrain shake or bounce, based on resonance of a mass of the fluid in the bounce inertia track, while, on the other hand, the idle inertia track is tuned so that the hydraulic mount exhibits a sufficiently reduced dynamic stiffness with respect to relatively high-frequency vibrations over a higher frequency range, such as engine idling vibrations, based on the resonance of a mass of the fluid in the idle inertia track.

In operation, vibrations in the higher frequency range are isolated by operation of the induced fluid oscillations in the upper fluid chamber passing through the idle inertia track and the resilient deformation of the main resilient element and the idle diaphragm in that the idle air chamber is at atmospheric pressure. For vibrations in the lower frequency range, the idle air chamber is evacuated by being connected to engine vacuum, wherein now the fluid oscillations of the upper fluid chamber travel through the bounce inertia track and are damped thereby in combination with the resilient deformation of the main resilient element and the bellows.

Hydraulic mounts are employed as load bearing mounts or as a combination load bearing and torque reacting mounts. In torque roll axis mounting systems, like the pendular system, the torque reacting elements in the system are predisposed to carry minimal static preload and to primarily react to powertrain torque. In particular, bushing style mounts as the torque reacting elements in pendular systems provide specific benefits to the powertrain mounting system overall isolation not offered by other types of hydraulic mounts.

Parent U.S. patent application Ser. No. 12/904,350, filed on Oct. 14, 2010, to Gannon et al, entitled "Mounting Systems for Transverse Front Wheel Drive Powertrains with Decoupled Pitch Damping", the entire disclosure of which is hereby incorporated herein by reference, describes a motor vehicle powertrain mounting system including a hydraulic device torque reacting component member flexibly interconnecting first and second torque reacting mount components. The present invention provides structural implementation of a hydraulic device as an integral component of a torque strut.

SUMMARY OF THE INVENTION

The present invention packages a hydraulic device into a torque strut of a powertrain mounting system, for example a pendular mounting system, so as to provide high hydraulic damping and stiffness at high vibration amplitude, and minimal to no hydraulic damping and stiffness at low vibration amplitude, thereby enabling the mounting system to have passively decoupled powertrain pitch damping as between high and low amplitudes of vibration.

According to the present invention, the conventional cylindrical head and rubber element disposed therewithin of the prior art torque strut is replaced by a head having disposed therewithin a hydraulic device so as to provide a fully decoupled hydraulic torque strut. The head has a U-shaped outer sleeve and disposed therein the hydraulic device includes a main rubber element connected distally to a D-shaped liner wall. At one side of the main rubber element is atmosphere, and at the other side is a pumping chamber. An inertia track connects the pumping chamber to a compensation chamber featuring a bellows. A decoupler system connects to the pumping chamber, and thereafter connects to the compensation chamber via a decoupler track. The decoupler system includes a loose, freely movable compliant membrane disposed between mutually opposed perforated sidewalls. Liquid fills the chambers, the tracks and the decoupler system.

In powertrain mounting systems, isolation and control of dynamic excitation of the powertrain about the torque roll axis (vehicle pitch direction for a transverse front wheel drive powertrain) largely depends on the functional characteristics of the torque reacting isolators. The present invention relates to powertrain mounting systems where high and low levels of vibration in the torque reacting torque strut mount is decoupled by the use of a hydraulic device that, depending on the displacement amplitude of the vibration, will either have no hydraulic damping or peak hydraulic damping tuned to the excitation frequency of vibration. Such devices are currently used in other configurations and under different load conditions, as for example load bearing mounts as described hereinabove, that do not provide the benefits stated herein.

The inertia track is always functioning to connect the pumping chamber to the compensation chamber. In addition, the decoupler track between the two chambers is used with respect to the decoupler system, and its presence distinguishes a fully decoupled torque strut mount from a non-decoupled torque strut mount. When vibration is imposed to the main rubber element, its resilient compliance results in the pumping chamber volume contracting or expanding, whereby the liquid passes through the inertia track to or from the compensation chamber, being compensatingly accommodated by the bellows. The inertia effect of the liquid column resonating in the inertia track produces damping in the hydraulic torque strut, and consequently higher dynamic stiffness than that of a conventional torque strut.

The function of the decoupler system is to manipulate the volumetric stiffness of the pumping chamber, wherein under small vibration amplitudes of the main rubber element, the compliant membrane will freely move and little or no fluid will move through the inertia track. However, for higher amplitude vibrations of the main rubber element, the compliant membrane will be displaced into occlusion of one or the other of the perforated sidewalls so as to prevent liquid motion through the decoupler system, and thereby forcing liquid to flow only through the inertia track. The decoupler gap between the perforated walls in relation to the thickness of the compliant membrane and the stiffness of the compliant membrane allow for tuning so that damping is provided at desired levels of vibration amplitudes.

The present invention disposes the decoupler system at the curving perimeter of the hydraulic bushing to enable a relatively large compliant membrane and further provide structurally robustness sufficient to avoid damage to the compliant membrane in the event of unusually high torque strut compressive forces. Due to the tight packaging space available in a torque strut, the bellows is configured to 'bulge' into the compensation chamber. The D-shape of the liner wall allows for traveling space of the main rubber element.

The present invention packages the decoupled hydraulic device functionality as described above in a bushing-style strut assembly, permitting its use as the torque reacting torque strut in an applicable powertrain mounting system, thus enabling low pitch stiffness and damping at low amplitudes of vibration, and high pitch stiffness and damping at high amplitudes of vibration.

Accordingly, it is an object of the present invention to utilize a hydraulic device in a torque strut mount of a powertrain mounting system, for example a pendular mounting system, so as to provide high hydraulic damping and stiffness at high vibration amplitude, and minimal to no hydraulic damping and stiffness at low vibration amplitude, thus enabling the mounting system to have passively decoupled pitch damping as between high and low amplitudes of vibration.

This and additional objects, features and advantages of the present invention will become clearer from the following specification of a preferred embodiment.

BRIEF DESCRIPTION OF THE DRAWINGS

FIG. 12 is a partly sectional view of the hydraulic torque strut according to the present invention as in FIG. 6, wherein the decoupler is functioning responsive to relatively low amplitude movements of the main rubber element.

FIG. 13 is a partly sectional view of the hydraulic torque strut according to the present invention as in FIG. 6, wherein the decoupler is disabled responsive to relatively higher amplitude movement of the main rubber element contracting the volume of the pumping chamber, as shown at FIG. 10.

FIG. 14 is a partly sectional view of the hydraulic torque strut according to the present invention as in FIG. 6, wherein the decoupler is disabled responsive to relatively higher amplitude movement of the main rubber element expanding the volume of the pumping chamber, as shown at FIG. 11.

DESCRIPTION OF THE PREFERRED EMBODIMENT

Figure 1:
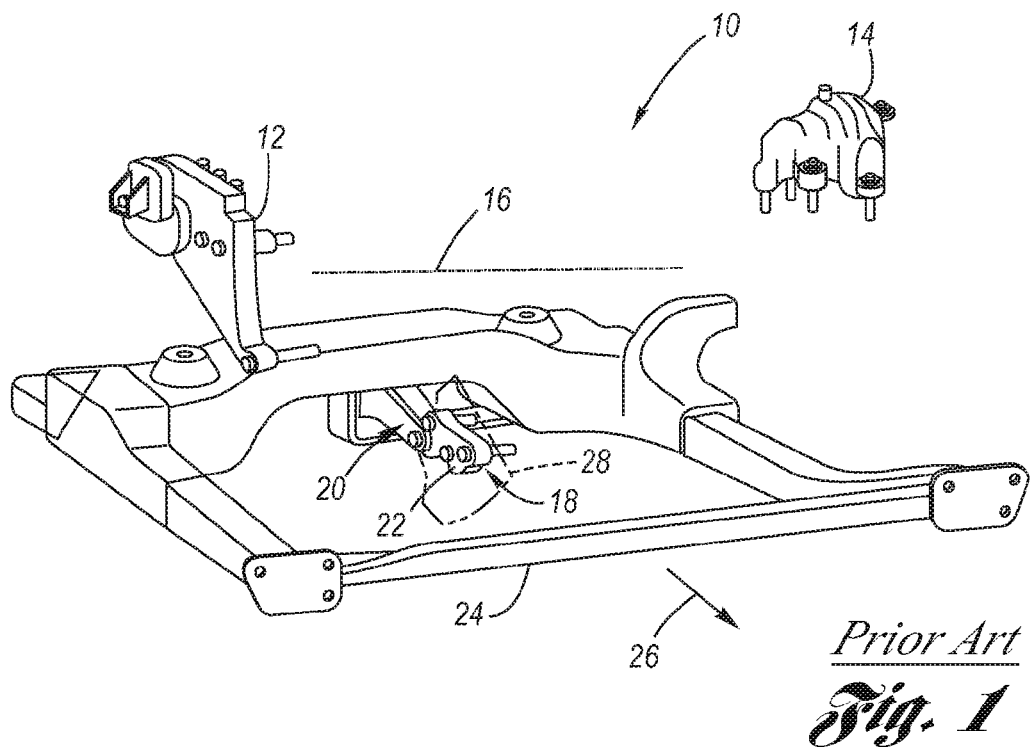
FIG. 1 is a schematic, perspective view of a prior art pendular mounting system for a motor vehicle.

Referring now to the Drawings, aspects of a hydraulic device torque reacting mount bushing for a torque reacting hydraulic torque strut of a powertrain mounting system according to the present invention are depicted in FIGS. 4 through 14.

As shown at FIGS. 4 through 8, the hydraulic torque strut 100, 100' according to the present invention has a head 102 having a U-shaped outer sleeve 104 composed of first and second parallel sleeve walls 104' which are mutually and integrally connected at one end by a curvilinear sleeve wall 104", and also composed of a complementarily shaped retainer wall 105 which is connected to the first and second sleeve walls and the curvilinear sleeve wall. At a distal disposition with respect to the curvilinear sleeve wall 104", each of the first and second sleeve walls 104' has a mutually opposing stem wall 112 which support a bellows retainer 115 having an aperture 115' formed therein whereat is disposed a bellows 114, whereby the bellows bridges the stem walls. Disposed within the U-shaped head 102 is a complementarily D-shaped metal liner 116, of single piece construction and defined by: a) first and second parallel liner walls 116' complementing and spaced from the sleeve walls 104', b) a curvilinear liner wall 116" complementing and spaced from the curvilinear sleeve wall 104", c) a third liner wall 116' spaced from and generally complementing the stem walls 112 and the bellows 114, and d) flanges 116"" which are crimpingly engaged by a crimp-over 105' of the retainer wall 105 (see FIG. 7). Preferably, the first and second sleeve walls 104', and the first, second and third liner walls 116', 116''' are generally straight.

Disposed within the outer sleeve 104 and the retainer wall 105 thereof is a rubber overmold 160 which in part packages a hydraulic device 130. A main rubber element 132 is affixed to the liner 116. A pumping chamber 134 is formed between one side 132' of the main rubber element 132 and the liner 116. At the other side 132" of the main rubber element 132 is an overmold void 138 which is open to atmosphere 110. A compensation chamber 142 is formed between the bellows 114 and the third liner wall 116''', wherein the opposite side of the bellows is open to atmosphere 110. An inertia track opening 144 is formed in the liner 116 generally at the apex of the curvilinear liner wall 116" which communicates with an inertia track 146. As best seen at FIG. 7, the inertia track 146 is preferably compartmented along a portion of its length, and is formed between the liner 116 and the retainer wall 105 of the outer sleeve 104, and as seen best at FIGS. 5 and 6, extends from the inertia track opening 144 to the compensation chamber 142. A decoupler system 150 communicates with the pumping chamber 134 through perforations 152 of the liner 116, and communicates further with a decoupler track 154. As best seen at FIG. 7, the decoupler track 154 is disposed oppositely of the head 102 with respect to the inertia track 146, being formed between the retainer wall 105 of the outer wall 104 and the liner 116. As seen best at FIGS. 5 and 6, the decoupler track 154 extends from the decoupler 150 to the compensation chamber 142. The pumping and compensating chambers 134, 142, the inertia and decoupler tracks 146, 154 and the decoupler system 150 are filled with a liquid 190, preferably glycol.

Figure 2:
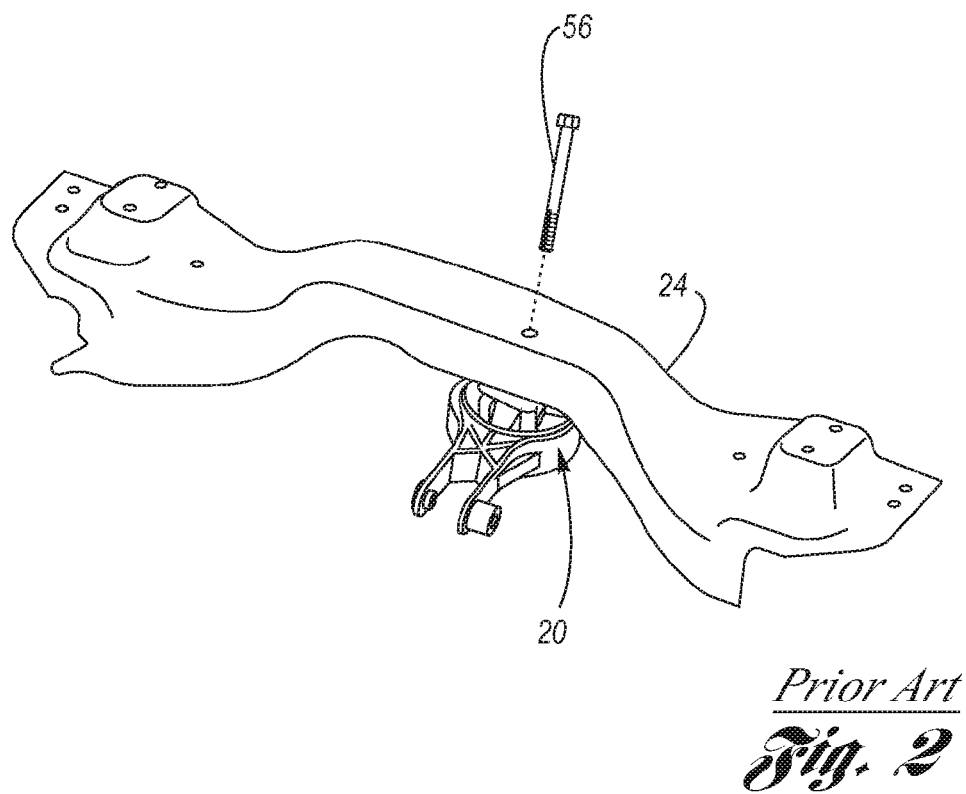
FIG. 2 is a detail view of the prior art pendular mounting system of FIG. 1, showing the attachment of a prior art torque strut to a cradle or other structural member.
Figure 3:
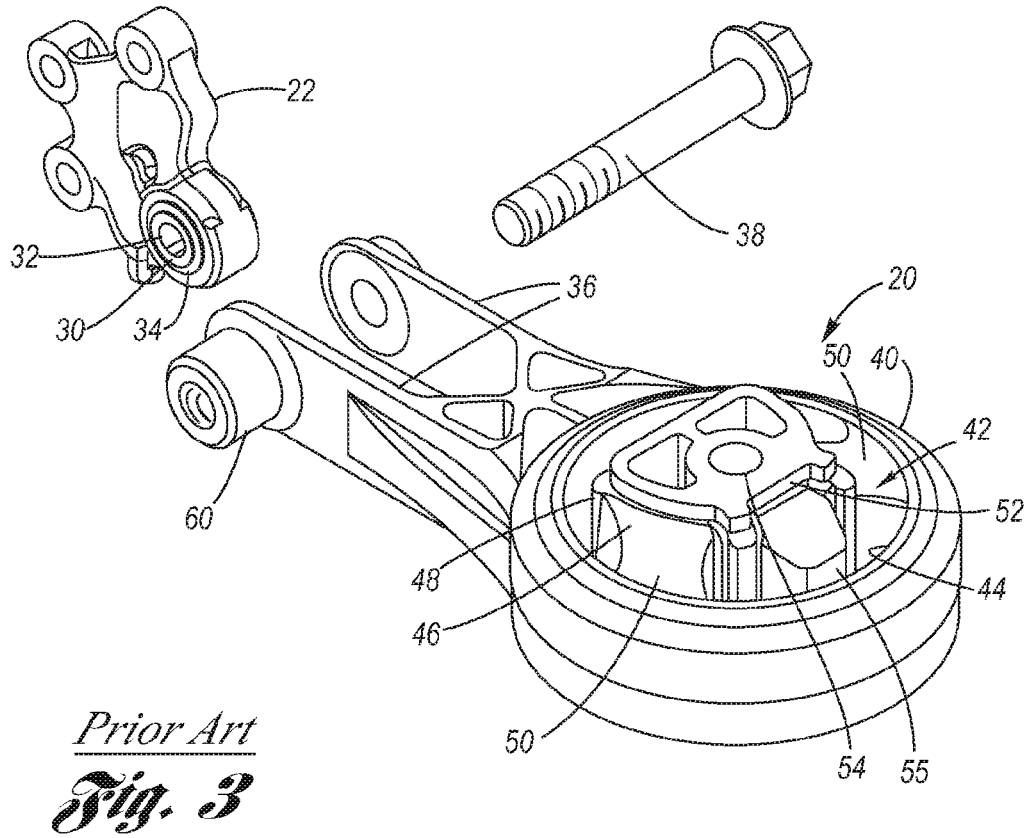
FIG. 3 is an exploded, perspective view of a prior art torque reacting torque strut mount of the prior art mounting system of FIG. 1.
Figure 4:
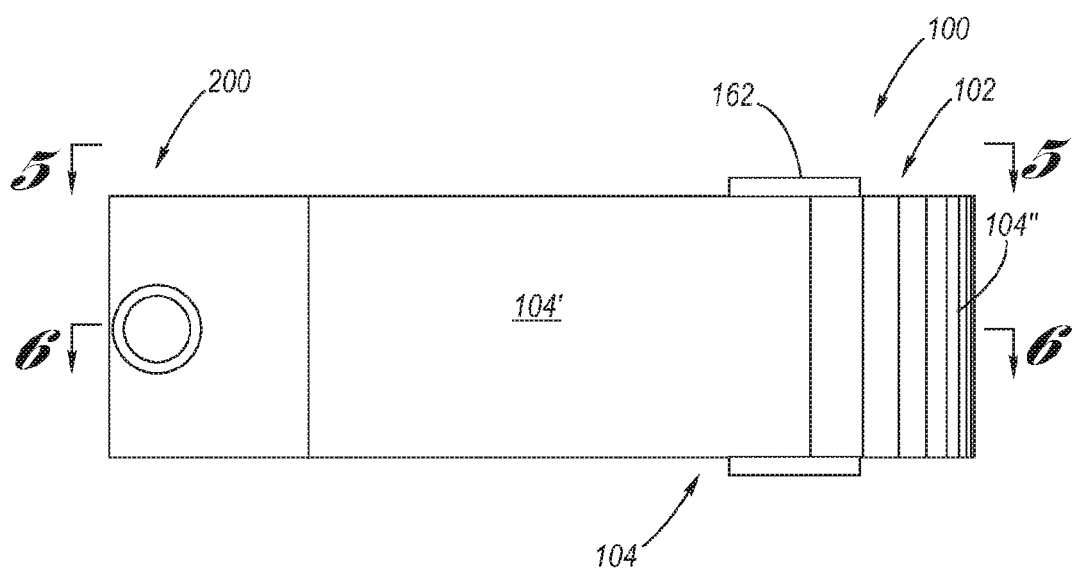
FIG. 4 is an elevational side view of a hydraulic torque strut according to the present invention, adapted for being pivotally connected to a torque strut bracket assembly as for example shown at FIG. 3.
Figure 5:
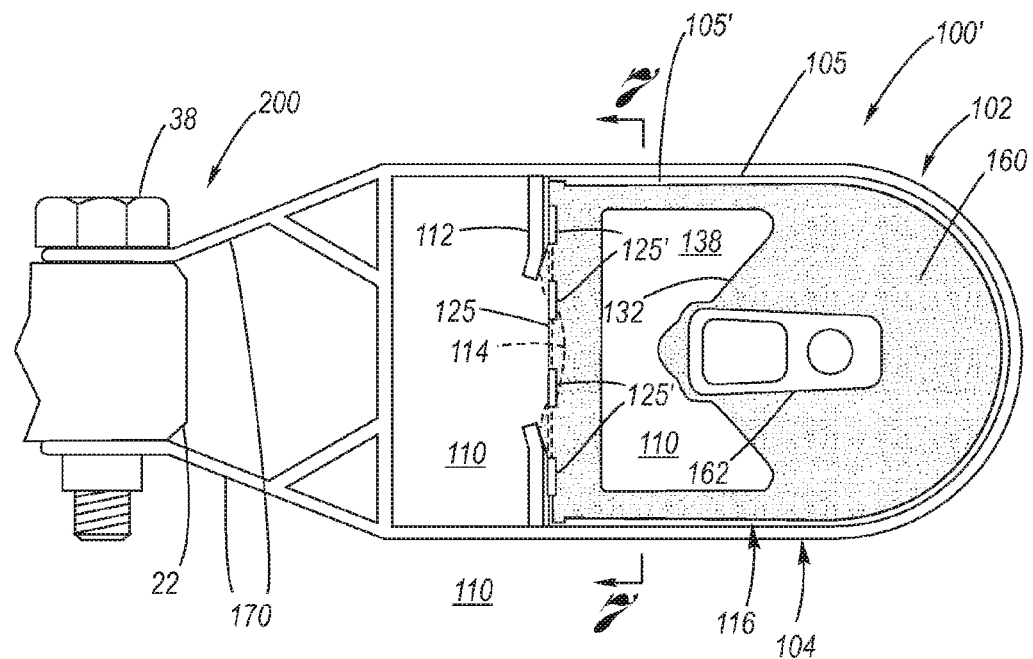
FIG. 5 is a top plan view of the hydraulic torque strut according to the present invention, seen along line 5-5 of FIG. 4.

The main rubber element 132 forms an integral part of a rubber overmold 160, wherein the overmold provides liquid containment closure for the pumping and compensating chambers 134, 142, the inertia and decoupler tracks 146, 154 and the decoupler system 150. An overmold retainer 125 is connected with the bellows retainer 115 and has a plurality of crimp-overs 125' for retaining the overmold 160. The main rubber element 132 at either distal end thereof attaches to (e.g., bonded to) the liner 116, mostly at the first and second liner walls 116', and may also include a portion of the curvilinear liner wall 116". The main rubber element 132 has a centrally disposed metal insert 162 having a through hole 164 for a bolt to pass therethrough, as for example bolt 56 of FIG. 2 so that the hydraulic torque strut may be attached to the cradle or other structural member, 24. A secondary bumper 155 is provided for providing an abutment to the curvilinear liner wall 116" in the event of an extreme engine pitch event, wherein the disposition of the abutment of the secondary bumper with the curvilinear liner wall is predetermined so as not to occlude the inertia track opening 144.

The portion of the hydraulic torque strut according to the present invention is adapted to pivotally connect to a conventional torque strut bracket assembly. The hydraulic torque strut 100 shown at FIGS. 5 and 6 has a bearing connection member 200 in the form of a bolt receiving clevis 170 which is connected to the outer sleeve 104, and which is structurally a mimic of the clevis 36 so as to be pivotally connected to the rigid bushing 30 of the torque strut bushing 22 via the bolt 38. The hydraulic torque strut 100' shown at FIG. 8 has a bearing connection member 200' in the form of a rigid bushing 172 connected to the outer sleeve 108. The rigid bushing 172 is in the form of a sleeve 174 set in rubber 176 for connecting to a conventional torque strut bracket assembly, wherein the axis of the sleeve is parallel to the axis of the through hole 164.

Figure 9:
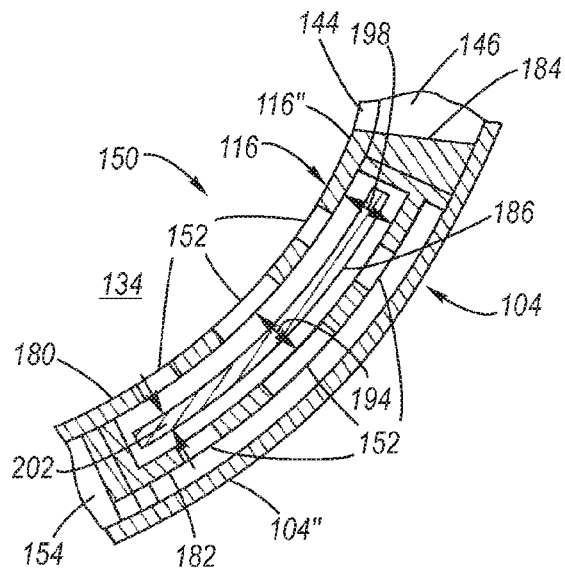
FIG. 9 is a detail view of the decoupler system of the hydraulic torque strut as seen at FIGS. 6 and 12, wherein the compliant membrane is freely movable in response to relatively low amplitude vibrations of the main rubber element.
Figure 10:
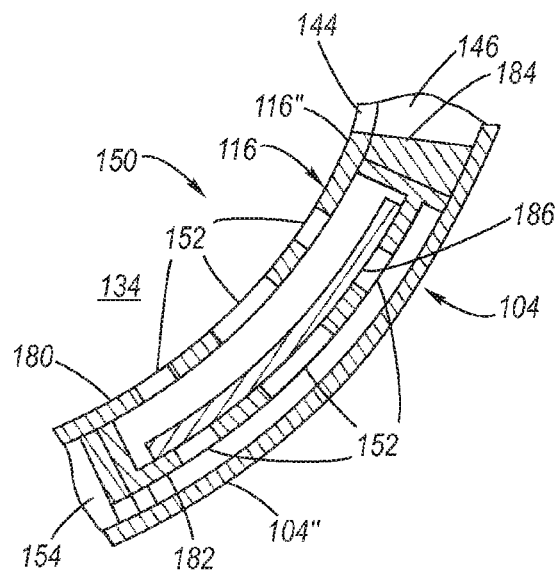
FIG. 10 is a detail view of the decoupler system as in FIG. 9, wherein now the compliant membrane is occluding the perforations of a second perforated decoupler sidewall in response to a relatively higher amplitude movement of the main rubber element contracting the volume of the pumping chamber, as depicted at FIG. 13.
Figure 11:
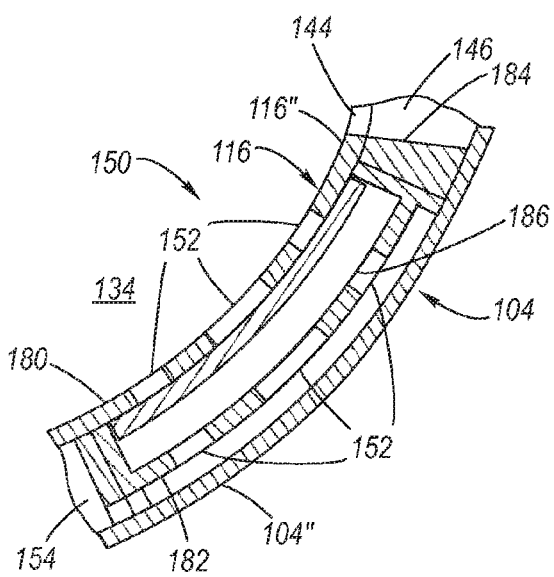
FIG. 11 is a detail view of the decoupler system as in FIG. 9, wherein now the compliant membrane is occluding the perforations of a first perforated decoupler sidewall in response to a relatively higher amplitude movement of the main rubber element expanding the volume of the pumping chamber, as depicted at FIG. 14.

The decoupler system 150 is shown in detail at FIGS. 9 through 11. The decoupler system is bounded by first and second perforated decoupler sidewalls 180, 182, each having a plurality of perforations 152 formed therein. Preferably, for the sake of compact packaging and robustness, the first perforated sidewall 180 is an integral section of the liner 116, preferably of the curvilinear liner wall 116", and closed off from the inertia track 146 by a dividing wall 184. Disposed between the first and second perforated decoupler sidewalls 180, 182 is a compliant membrane 186. In that the decoupler system 150 is disposed at the curvilinear liner wall 116", the first and second perforated decoupler sidewalls 180, 182 and the compliant membrane 186 are similarly curvilinear.

In operation of the decoupler system 150, for relatively low amplitude vibrations of the main rubber element 132, as shown at FIG. 9, the compliant membrane 186 is loose between the first and second perforated decoupler sidewalls 180, 182 and is free to move therebetween; however for relatively large amplitude vibrations of the main rubber element, as shown at FIGS. 10 and 11, the compliant membrane 186 is sized to occludingly superpose the perforations 152 of one or the other of the first and second perforated decoupler sidewalls 180, 182 when in respective contact therewith.

Referring now additionally to FIGS. 12 through 14, operation of the hydraulic torque strut according to the present invention will be detailed.

Figure 6:
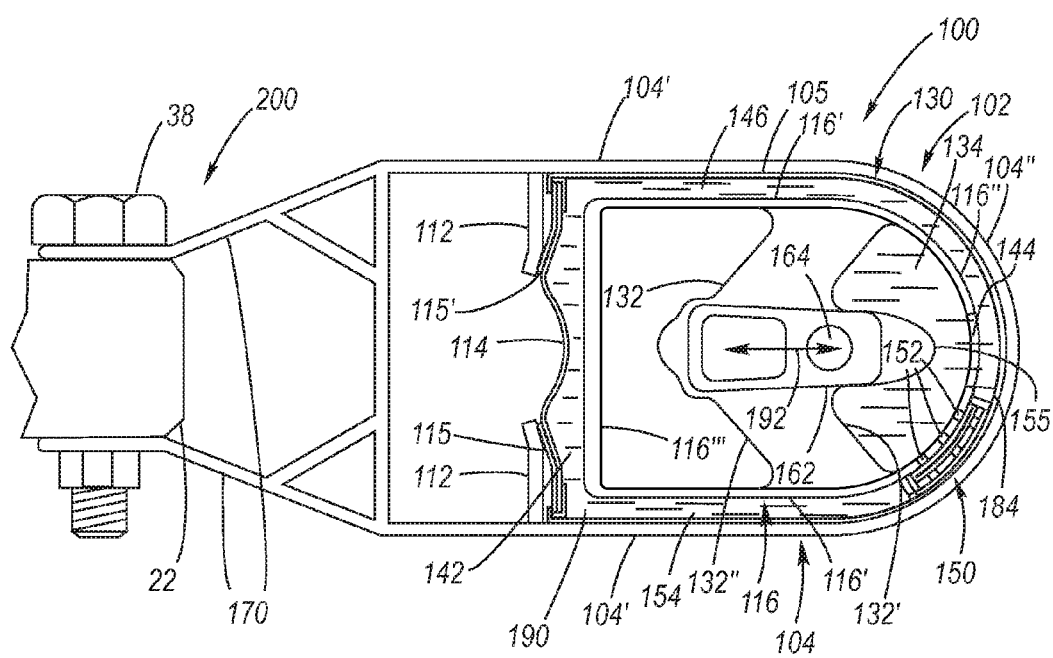
FIG. 6 is a partly sectional view of the hydraulic torque strut according to the present invention, seen along line 6-6 of FIG. 4, wherein the overmold is shown partly removed.
Figure 7:
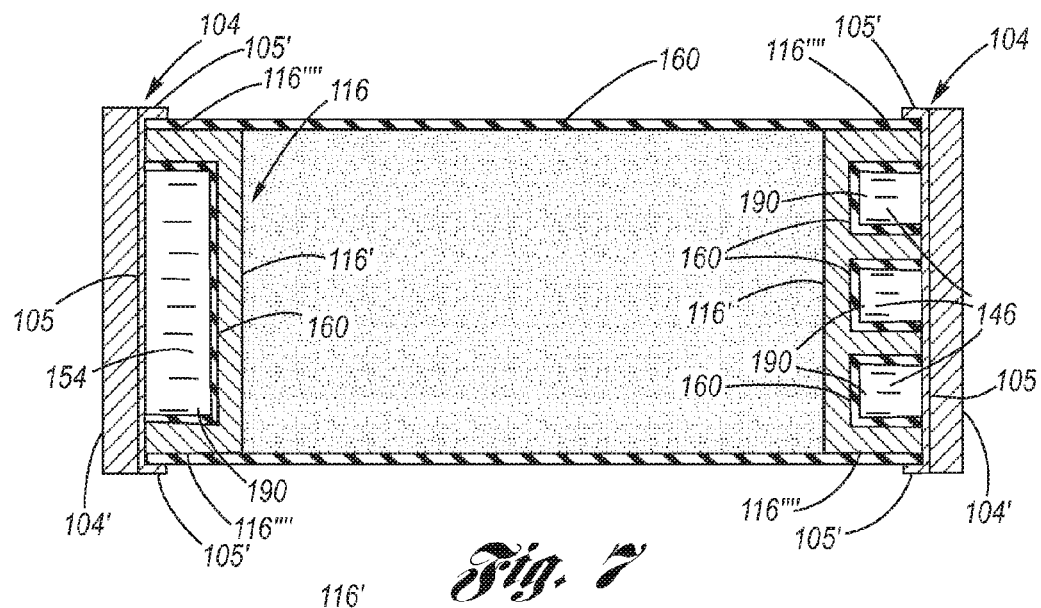
FIG. 7 is a sectional view of the hydraulic torque strut according to the present invention, seen along line 7-7 of FIG. 5.
Figure 8:
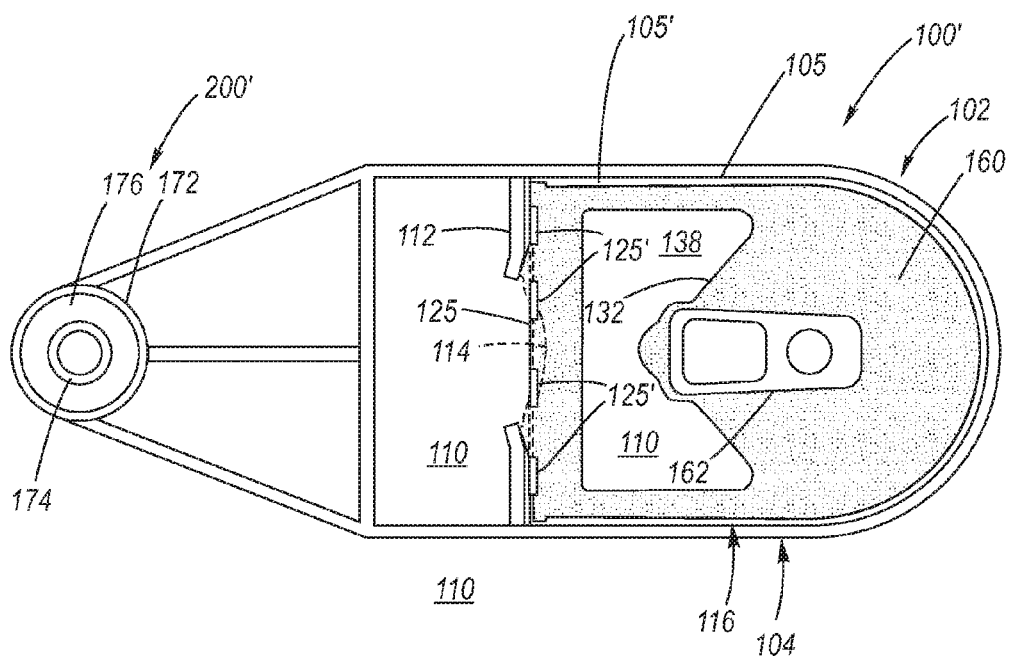
FIG. 8 is a top plan view of a hydraulic torque strut according to the present invention similar to FIG. 5, but now featuring an alternatively oriented bushing.

In response to powertrain torque oscillation, the main rubber element 132 will oscillate, per arrow 192 in FIG. 6, which will then cause the liquid 190 of the pumping chamber 134 to oscillate.

As shown at FIGS. 9 and 12, for small amplitude oscillations of the liquid, the main rubber element will vibrate with relatively low amplitude vibrations, per arrow 192' of FIG. 12, wherein the compliant membrane 186 will freely oscillate, as per arrow 194 in FIG. 9. However, for larger amplitude oscillations of the main rubber element 132, the complaint membrane 186 will abut one or the other of the first and second perforated decoupler sidewalls 180, 182.

As shown at FIGS. 10 and 13, the main rubber element 132 has moved along arrow 192" so as to contract the volume of the pumping chamber 134 with sufficient amplitude that the compliant membrane 186 abuts the second perforated decoupler sidewall 182, thereby occluding its perforations 152. As shown at FIGS. 11 and 14, the main rubber element 132 has moved along arrow 192''' so as to expand the volume of the pumping chamber 134 with sufficient amplitude that the compliant membrane 186 abuts the first perforated decoupler sidewall 180, thereby occluding its perforations 152. In this regard, whenever the perforations 152 are occluded by the compliant membrane 186, then the liquid 190 must oscillate, as per arrows 196, 196' in FIGS. 13 and 14 between the pumping chamber 134 and the compensating chamber 142 via the inertia track 146, as accommodated by flexing of the bellows 114. The inertia effect of the liquid column resonating in the inertia track produces damping in the hydraulic torque strut of the present invention, and consequently higher dynamic stiffness than that of a conventional torque strut.

The function of the decoupler system 150 is to manipulate the volumetric stiffness of the pumping chamber 134, wherein under small vibration amplitudes of the main rubber element 132, the compliant membrane 186 will freely move and little or no liquid 190 will move through the inertia track 146. However, for higher amplitude vibrations of the main rubber element 132, the compliant membrane 186 will be displaced into occlusion of one or the other of the first and second perforated decoupler sidewalls 180, 182 so as to prevent liquid passing through the decoupler system 150, and thereby forcing liquid to flow only through the inertial track 146. As shown at FIG. 9, the decoupler pocket 198 between the perforated walls in relation to the thickness 202 of the compliant membrane 186 and the stiffness of the compliant membrane allow for tuning so that damping is provided at desired levels of vibration amplitudes.

The present invention packages the decoupled hydraulic device functionality as described above in a bushing-style strut assembly, permitting its use as the torque reacting hydraulic torque strut in an applicable powertrain mounting system, thus enabling low pitch stiffness and damping at low amplitudes of vibration, and high pitch stiffness and damping at high amplitudes of vibration.

The demarcation between "high" and "low" vibration amplitudes of powertrain pitching around the torque roll axis of the powertrain whereat the decoupler system is active or disabled is determined by empirical testing or computer modeling for the particular vehicle application. However, by way merely of exemplification, any amplitude above about 0.5 millimeter of powertrain pitch acting at the hydraulic device torque reacting mount bushing may be considered a "high" vibration amplitude.

Further, by exemplification the terms "minimal" and "high" as used to describe damping and/or stiffness may, for example, represent about at least an order of magnitude difference, wherein the term "minimal" is the lesser therebetween.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A hydraulic torque strut for a motor vehicle powertrain mounting system, said hydraulic torque strut comprising:
   a liquid;
   a head comprising an outer sleeve, said outer sleeve comprising a curvilinear sleeve wall;
   a liner disposed within, and in spaced relation to, said outer sleeve, said liner comprising a curvilinear liner wall disposed in complementing, spaced relation to said curvilinear sleeve wall;
   an overmold comprising a main rubber element having a first side and an opposite second side, wherein distal ends of said main rubber element are stationarily disposed with respect to said liner;
   a pumping chamber filled with the liquid and disposed at said first side of said main rubber element, wherein said second side of the main rubber element is exposed to the atmosphere;
   a compensating chamber filled with the liquid;
   a flexible bellows elastically separating said compensating chamber from the atmosphere;
   an inertia track filled with the liquid and extending between, and hydraulically communicating with, said pumping chamber and said compensating chamber;
   a decoupler system filled with the liquid, said decoupler system comprising:
      a first perforated decoupler sidewall formed of said liner at said curvilinear liner wall thereof;

a second perforated decoupler sidewall spaced from said first perforated decoupler sidewall; and a compliant membrane loosely disposed between said first and second perforated decoupler sidewalls, said compliant membrane being sized to selectively occlude in superposing relation the perforations of said first and second perforated decoupler sidewalls; and a decoupler track filled with the liquid and extending between, and hydraulically communicating with, said decoupler system and said compensating chamber;

wherein for low amplitude vibration of said main rubber element with respect to said liner, not more than minimal hydraulic damping and stiffness is provided via said decoupler track, absence of said compliant membrane occluding the perforations of the first and second perforated decoupler sidewalls and free movement of said compliant membrane responsive to said low amplitude vibration; and wherein for high amplitude vibration of said main rubber element with respect to said liner, hydraulic damping and stiffness greater than the minimal hydraulic damping is provided via said inertia track and said compliant membrane occluding the perforations of one of the first and second perforated decoupler sidewalls responsive to the high amplitude vibration.

2. The hydraulic torque strut of claim 1, further comprising a bearing connection member connected to said outer sleeve opposite said head.

3. The hydraulic torque strut of claim 1, wherein said inertia track hydraulically communicates with said pumping chamber at an inertia track opening of said liner wall; said inertia track opening being disposed substantially at an apex of said curvilinear liner wall.

4. The hydraulic torque strut of claim 3, wherein:

said curvilinear sleeve wall has a first end and an opposite second end, said outer sleeve further comprising a first sleeve wall connected to said first end of said curvilinear sleeve wall, and a second sleeve wall connected to said second end of said curvilinear sleeve wall; and said curvilinear liner wall has first end and an opposite second end, said liner further comprising a first liner wall connected to said first end of said curvilinear liner wall, and a second liner wall connected to said second end of said curvilinear liner wall;

said inertia track being disposed between said outer sleeve inclusive of said first sleeve wall and said liner inclusive of said first liner wall; and said decoupling track being disposed between said outer sleeve inclusive of said second sleeve wall and said liner inclusive of said second liner wall.

5. The hydraulic torque strut of claim 4, wherein said distal ends of said main rubber element are stationarily disposed in relation to said first and second liner walls.

6. The hydraulic torque strut of claim 5, wherein each of said first sleeve wall, said first liner wall, said second sleeve wall and said second liner wall are substantially straight.

7. The hydraulic torque strut of claim 5, further comprising a third liner wall connected to said first and second liner walls opposite said curvilinear liner wall; wherein said compensation chamber is disposed between said third liner wall and said bellows.

8. The hydraulic torque strut of claim 7, further comprising a stem wall connected, respectively, to each of said first and second sleeve walls; wherein said bellows bridges, and is supported by each said stem wall.

9. The hydraulic torque strut of claim 8, further comprising a bearing connection member connected to said outer sleeve opposite said head.

10. The hydraulic torque strut of claim 9, wherein each of said first sleeve wall, said first liner wall, said second sleeve wall and said second liner wall are substantially straight.

11. A hydraulic torque strut for a motor vehicle powertrain mounting system, said hydraulic torque strut comprising:

a liquid;

a head comprising a generally U-shaped outer sleeve, said outer sleeve comprising a curvilinear sleeve wall;

a generally D-shaped liner disposed within, and in spaced relation to, said outer sleeve, said liner comprising a curvilinear liner wall disposed in complementing, spaced relation to said curvilinear sleeve wall;

an overmold comprising a main rubber element having a first side and an opposite second side, wherein distal ends of said main rubber element are stationarily disposed with respect to said liner;

a pumping chamber filled with the liquid and disposed at said first side of said main rubber element, wherein said second side of the main rubber element is exposed to the atmosphere;

a compensating chamber filled with the liquid;

a flexible bellows elastically separating said compensating chamber from the atmosphere;

an inertia track filled with the liquid and extending between, and hydraulically communicating with, said pumping chamber and said compensating chamber via an inertia track opening of said liner wall disposed substantially at an apex of said curvilinear liner wall;

a decoupler system filled with the liquid, said decoupler system comprising:

a first perforated decoupler sidewall formed of said liner at said curvilinear liner wall thereof;

a second perforated decoupler sidewall spaced from said first perforated decoupler sidewall; and a compliant membrane loosely disposed between said first and second perforated decoupler sidewalls, said compliant membrane being sized to selectively occlude in superposing relation the perforations of said first and second perforated decoupler sidewalls;

a decoupler track filled with the liquid and extending between, and hydraulically communicating with, said decoupler system and said compensating chamber; and a bearing connection member connected to said outer sleeve opposite said head;

wherein for low amplitude vibration of said main rubber element with respect to said liner, not more than minimal hydraulic damping and stiffness is provided via said decoupler track, absence of said compliant membrane occluding the perforations of the first and second perforated decoupler sidewalls and free movement of said compliant membrane responsive to said low amplitude vibration; and wherein for high amplitude vibration of said main rubber element with respect to said liner, hydraulic damping and stiffness greater than the minimal hydraulic damping is provided via said inertia track and said compliant membrane occluding the perforations of one of the first and second perforated decoupler sidewalls responsive to the high amplitude vibration.

12. The hydraulic torque strut of claim 11, wherein:

said curvilinear sleeve wall has a first end and an opposite second end, said outer sleeve further comprising a first sleeve wall connected to said first end of said curvilinear sleeve wall, and a second sleeve wall connected to said second end of said curvilinear sleeve wall; and said curvilinear liner wall has first end and an opposite second end, said liner further comprising a first liner wall connected to said first end of said curvilinear liner wall, and a second liner wall connected to said second end of said curvilinear liner wall;

said inertia track being disposed between said outer sleeve inclusive of said first sleeve wall and said liner inclusive of said first liner wall; and said decoupling track being disposed between said outer sleeve inclusive of said second sleeve wall and said liner inclusive of said second liner wall.

13. The hydraulic torque strut of claim 12, wherein said distal ends of said main rubber element are stationarily disposed in relation to said first and second liner walls.

14. The hydraulic torque strut of claim 13, wherein each of said first sleeve wall, said first liner wall, said second sleeve wall and said second liner wall are substantially straight.

15. The hydraulic torque strut of claim 13, further comprising a third liner wall connected to said first and second liner walls opposite said curvilinear liner wall; wherein said compensation chamber is disposed between said third liner wall and said bellows.

16. The hydraulic torque strut of claim 15, further comprising a stem wall connected, respectively, to each of said first and second sleeve walls; wherein said bellows bridges, and is supported by each said stem wall.

17. The hydraulic torque strut of claim 16, further comprising a bearing connection member connected to said outer sleeve opposite said head.

18. The hydraulic torque strut of claim 17, wherein each of said first sleeve wall, said first liner wall, said second sleeve wall and said second liner wall are substantially straight.

* * * * *